United States Patent [19]

Kishida et al.

[11] Patent Number: 4,510,024
[45] Date of Patent: Apr. 9, 1985

[54] NOVEL POLYMER COMPOSITION

[75] Inventors: Kazuo Kishida; Isao Sasaki, both of Hiroshima; Nobuhiro Mukai, Ohtake; Hajime Asai, Hiroshima, all of Japan

[73] Assignee: Mitsubishi Rayon Co., Ltd., Tokyo, Japan

[21] Appl. No.: 542,950

[22] Filed: Oct. 18, 1983

[30] Foreign Application Priority Data

Oct. 19, 1982 [JP] Japan .................. 57-183294
Oct. 19, 1982 [JP] Japan .................. 57-183295
Dec. 27, 1982 [JP] Japan .................. 57-226652
Jan. 20, 1983 [JP] Japan .................. 58-6601

[51] Int. Cl.$^3$ .................................. C25B 3/00
[52] U.S. Cl. .................... 204/59 R; 204/72; 204/181 R
[58] Field of Search ............. 204/59 R, 72, 181 R

[56] References Cited

U.S. PATENT DOCUMENTS

| 4,039,697 | 8/1977 | Isawa | 204/181 R |
| 4,075,133 | 2/1978 | Sekmukus | 204/181 R |
| 4,248,753 | 2/1981 | Buchwalter | 204/181 R |
| 4,272,346 | 6/1981 | Jakubowski | 204/181 R |

Primary Examiner—John F. Niebling
Attorney, Agent, or Firm—Armstrong, Nikaido, Marmelstein & Kubovcik

[57] ABSTRACT

A polymer composition in which an organic polymer and carbon fiber are strongly combined and a process for producing the polymer composition by the electrolytic polymerization of a reactive monomer using the carbon fiber as an electrode, which process is characterized in that the polymerization is carried out by adding an aliphatic epoxy compound, alicyclic epoxy compound, organic titanate compound, or vinylsilane compound, as part or all of the reactive monomer.

5 Claims, 1 Drawing Figure

U.S. Patent    Apr. 9, 1985    4,510,024
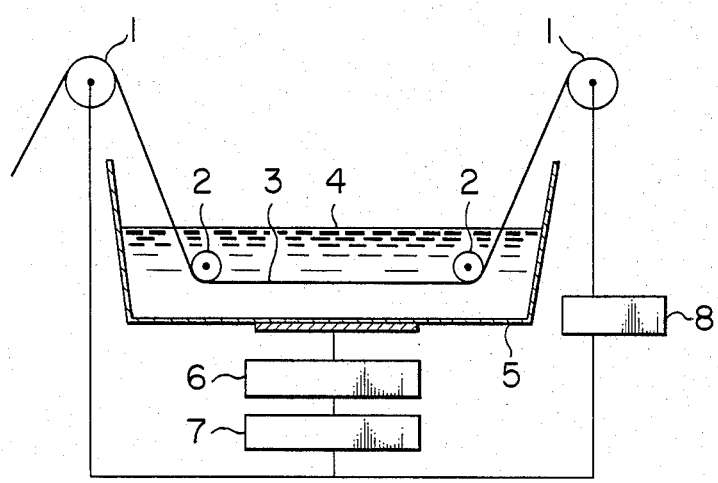

NOVEL POLYMER COMPOSITION

This invention relates to a process for producing a novel polymer composition in which carbon fiber (hereinafter abbreviated as "CF") and an organic polymer are strongly combined, by the electrolytic polymerization method.

A process for producing a metal-organic polymer composition is known which comprises electrolytic polymerization of a reactive monomer using a metal such as iron, copper, or silver as an electrode. However, from the industrial point of view, there is little possibility of putting this process to practical use because of a low polymerization activity of the monomer and a markedly limited amount of the polymer deposited on the metal.

For example; Subramanian, R. V. and Jakubowski, J. J. reported on "Electrolytic polymerization behavior and physical properties of vinyl monomers and Azyrydine compounds" {Polym. Eng. Sci., 18, p.590 (1978)} and on "Electrochemical coating with phosphorous-containing organic titanate compound" [Composites, 161, (1980)]; Japanese Patent Application Laid-Open No. 72496/74 disclosed that electrolytic graft polymerization of a vinyl monomer on CF improves the tensile strength by 10-15%; and Japanese Patent Application Laid-Open No. 122894/78 disclosed that the inter-laminar shear strength (ILSS) of a CF composite is improved by electrolytic polymerization of a vinyl monomer in the presence of a peroxide using the CF as cathode.

However, these prior techniques were unsuccessful in solving the above noted problems.

In view of the above, the present inventors made intensive studies and found out that, in the production of a CF-organic polymer composition by electrolytic polymerization of a reactive monomer using an electrode of electrically conductive CF, the use of an aliphatic epoxy compound, alicyclic epoxy compound, organic titanate compound, or vinylsilane compound as part or all of the reacctive monomer results in a strikingly improved polymerization activity of reactive monomer and a novel polymer composition, unobtainable by the prior art process, in which the organic polymer is coupled in a large amount and strongly with the electrode CF and has a good sizing effect. Based on this finding, this invention has been accomplished.

Up to now, research and development have been extensively made from composite materials which are products of combining two or more materials for supplying deficiencies in the properties of the individual materials and for creating a new beneficial function. Under such circumstances, improvements in a wide variety of properties for example, mechanical strength, elastic modulus, heat distortion temperature, and electric properties have been reported concerning the formation of composite from CF which is useful as filler for reinforcement of organic polymers. These composites, however, are deficient in interfacial affinity such as compatibility or adhesion between CF and another component, viz. organic polymer, since these components distinctly differ from each other in properties, so that a sufficient combining effect cannot be exhibited. This is the present situation of the art.

For the purpose of improving CF composites in this respect, attempts have been made to enforce the interfacial affinity between organic polymer and CF, which include the graft polymerization of vinyl monomer on the surface of CF oxidized by treatment with an inorganic acid and the grafting of organic polymer onto CF irradiated with high energy radiation. However, these attempts have significant problems in the aspect of practical applications, such as the complication of operating steps and a remarkable increase in the production cost.

It is the primary object of this invention to provide a process for producing a polymer composition which solves the above noted problems.

Thus, this invention provides a process for producing a polymer composition, wherein an organic polymer is strongly bonded to CF, characterized by using an aliphatic epoxy compound, alicyclic epoxy compound, organic titanate compound, or vinylsilane compound as a part or all of reactive monomer in the process wherein the reactive monomer is electrolytically polymerized using the CF as an electrode.

When the electrolytic polymerization of reactive monomer is conducted even in the presence of a supporting electrolyte, the percentage of polymerization is generally on a considerably low level even after a long period of polymerization. On the contrary, a quite specific polymerization activity is brought about, according to this invention, by using the above cited monomer as a part or all of the reactive monomer, and a large amount of polymer is formed in several seconds on the surface of CF with such a high percentage of polymerization as to be practically useful and additionally the polymer has a good sizing effect, thereby much improving the CF binding state.

Another feature of this invention is that the interaction between CF and the polymer formed according to the process of this invention is stronger than an adhesion such as simple adsorption or the like. Thus the polymer firmly binds the CF, exerting an excellent sizing effect.

An illustration of the form of carrying out this invention is as follows: an electrolytic solution is prepared by dissolving a reactive monomer and a supporting electrolyte in a solvent. A CF roving is immersed in the electrolytic solution and D.C. voltage is applied between the CF roving and the electrolytic solution for a prescribed period to polymerize the reactive monomer on the CF surface. Thus, a large amount of uniform polymer can be formed from the reactive monomer with a high percentage of polymerization to adhere strongly to the CF surface. For this polymerization, the presence of the above four components is an essential condition. However, the supporting electrolyte need not always be present in the electrolytic solution during the electrolytic polymerization. That is, a similar polymer composition can also be obtained by using the CF pretreated with the supporting electrolyte, without adding the supporting electrolyte to the electrolytic solution.

Cations which can constitute the supporting electrolyte used in this invention are alkali metal ions ($Li^+$, $Na^+$, $K^+$, $Rb^+$, and $Cs^+$); $NH_4^+$, and quaternary alkyl ammonium ions of the formula $R_4N^+$, wherein $R_4$ represents lower alkyl such as methyl, ethyl, n-propyl, isopropyl, n-butyl, n-hexyl, or the like; and sometimes include alkaline earth metal ions and as organic cations; substituted quaternary alkylammonium ions of the formula $R_n'R''_{4-n}N^+$, wherein $R'$ represents alkyl, $R''$ represents aryl or aralkyl, and n represent an integer of 1-4; quaternary phosphonium ions ($R_4P^+$); and tertiary sulfonium ions ($R_3S^+$).

Anions which can constitute the supporting electrolyte are halogen ions (Cl⁻, Br⁻, and I⁻), sulfate ion ($SO_4^{2-}$), nitrate ion ($NO_3^-$), perchlorate ion ($ClO_4^-$), various sulfonate ions, various carboxylate ions, tetrafluoroborate ion ($BF_4^-$), and so forth.

Accordingly, various salts can be formed by combining the above-cited cations and anions and can be used as supporting electrolytes in this invention. It is a matter of course that bases from the above cations and acids from the above anions can also be used as the supporting electrolyte.

Thus, compounds of, for example, the following formulae, can be used as supporting electrolytes in this invention: LiCl, $NaClO_4$, $NaNO_3$, $KClO_4$, $EtNClO_4$, n-$Bμ_4NClO_4$, n-$Bμ_4NI$, NaI, $Et_4NBr$, $Et_4NI$, $LiClO_4$, $NaBF_4$, KCl, KI, $NH_4Cl$, $NH_4NO_3$, $KNO_3$, $NaClO_4$, $LiNO_3$, HCl, $H_2SO_4$, $ZnCl_2$, NaOAc, $NH_4OAc$, KOH, $NH_4Cl$, and LiBr.

The specific reactive compound used in this invention has two or more functional groups in the molecule, which act as active sites for making strong bonds between the polymer and the CF surface and for reacting with the matrix resin. Preferred reactive compounds are:

(1) Aliphatic epoxy compounds represented by the general formula

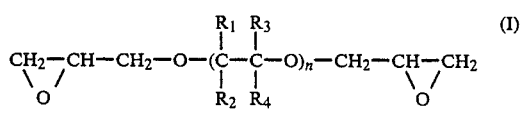

wherein; $R_1$, $R_2$, $R_3$, and $R_4$ represent hydrogen, $C_1$-$C_{20}$ alkyl, phenyl, substituted phenyl having $C_1$-$C_{20}$ alkyl, or halogen; and n represents an integer of 0–50, preferably 0–20;

(2) alicylic epoxy compounds represented by the general formula

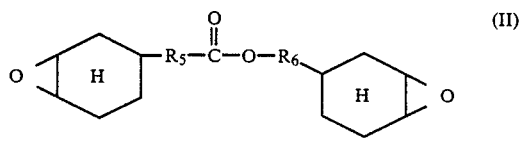

wherein; $R_5$ represents

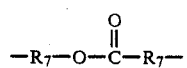

($R_7$ represents $C_1$-$C_{20}$ alkylene); and $R_6$ represents $C_1$-$C_{30}$ alkylene;

(3) alicyclic epoxy compounds represented by the general formula

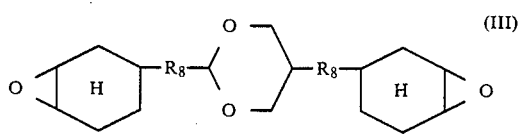

wherein $R_8$ represents $C_1$-$C_{30}$ alkylene;

(4) organic titanate compounds represented by the general formula

wherein $R_9$ represents $C_1$-$C_{50}$ alkyl;

(5) organic titanate compounds represented by the general formula

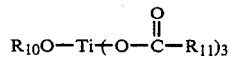

wherein $R_{10}$ represents hydrogen or $C_1$-$C_{40}$ alkyl and $R_{11}$ represents $C_1$-$C_{40}$ alkyl; and (6) vinylsilane compounds represented by the general formula

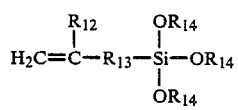

wherein; $R_{12}$ represents hydrogen, $C_1$-$C_{20}$ alkyl, phenyl, substituted phenyl having $C_1$-$C_{20}$ alkyl, or halogen; $R_{13}$ represents $(CH_2)_m$ or $COO(CH_2)_Q$ (m is an integer of 0–30 and Q is an integer of 0–20); and $R_{14}$ represents hydrogen, $C_1$-$C_{15}$ alkyl, or —Y—O—Z (Y is $C_1$-$C_{15}$ alkylene and Z is $C_1$-$C_{15}$ alkyl).

Examples of the aliphatic epoxy compound are ethylene glycol diglycidyl ether, polyethylene glycol diglycidyl ethers, propylene glycol diglycidyl ether, polypropylene glycol diglycidyl ethers, neopentyl glycol diglycidyl ether, glycerol polyglycidyl ethers, trimethylolpropane polyglycidyl ethers, pentaerythritol polyglycidyl ethers, diglycerol polyglycidyl ethers, and sorbitol polyglycidyl ethers. These are favorable in marked sizing effect and high electrolytic polymerization activity.

Examples of the alicyclic epoxy compounds are bis-epoxycyclohexylcarboxylates, bis-epoxycyclohexyldicarboxylates, and bis-epoxycyclohexyldioxanes. These are favorable in marked sizing effect and high polymerization activity.

Examples of the organic titanate compound are tetraalkoxytitaniums and monoalkoxytitaniumtrialkylates. These are favorable in marked sizing effect and high polymerization activity.

Examples of the vinylsilane compound are vinyltrimethoxysilane, vinyltriethoxysilane, vinyltripropoxysilane, vinyltributoxysilane, vinyl-tris(β-methoxymethoxy)silane, vinyl-tris(β-methoxyethoxy(silane, vinyl-tris(β-methoxypropoxy)silane, vinyl-tris(β-methoxybutoxy)silane, γ-methacryloxymethyltrimethoxysilane, γ-methacryloxyethyltrimethoxysilane, γ-methacryloxypropyltrimethoxysilane, and γ-methacryloxybutyltrimethoxysilane. Particularly, vinyltriethoxysilane, vinyl-tris(β-methoxyethoxy)silane, and γ-methacryloxypropyltrimethoxysilane are favorable in marked sizing effect and high polymerization activity.

CF's used in this invention include, for example; those of high tenacity and high modulus of elasticity produced from polyacrylonitrile or copolymer thereof; those produced from high-temperature-cracked petroleum pitch, coal tar pitch, or coal-depolymerized product; and those produced by the vapor deposition method. either carbonaceous CF or graphitic CF can be applied. These various types of CF may or may not have been subjected to the usual surface-oxidizing treatment.

As to the form of CF, rovings in the form of long fibers having a fiber diameter of 0.1-5μ are desirable. When such CF is used, a very high sizing effect is obtained. CF of 5μ or less in fiber diameter, which has been conventionally used, is liable to undergo fuzzing and monofilament-break. Accordingly, it is very important for the conventional CF to be protected with a size. However, because of its poor property for handling, its uniform sizing is extremely difficult. Nevertheless, according to the process of this invention, a uniform sizing effect can be achieved without inflicting any damage on CF, this being a great advantage of this invention.

The reactive comonomer used in this invention is not particularly limited. For instance, usual radical-polymerizable vinyl monomers can be used.

Examples of such vinyl monomers are acrylic acid and esters thereof, methacrylic acid and esters thereof, styrene, acrylonitrile, vinyl acetate, acrylamide, maleic anhydride, vinylpyrrolidone, and vinylpyridine.

The compositions according to this invention are all obtained in bundled form having a good interfacial adhesive property and good processability.

In this invention, the concentration of the reactive compound in the electrolytic solution ranges approximately from 0.05 to 100%, preferably from 0.1 to 50%, particularly preferably from 0.5 to 30%, by weight. The weight ratio of the reactive monomer or mixture thereof to the used CF can be varied over a wide range, that is, approximately from 500:1 to 1:500, preferably from 50:1 to 1:50.

The amount of the solvent ranges aproximately from 0.0001 to thousands times, preferably from 0.01 to 100 times, based on the total weight of CF and monomer.

Any solvent may be employed in this invention unless it hinders the achievement of the object of this invention. Suitable solvents include, for example, water; alcohols such as methanol, ethanol, glycerol, and cellosolves; ethers such as diethyl ether, tetrahydrofuran, and 1,4-dioxane; nitriles such as acetonitrile, butyloacetonitrile, and benzoacetonitrile; amines such as ammonia, ethylenediamine, and pyridine; amides such as formamide, dimethylformamide, and dimethylacetamide; sulfur compounds such as sulfur dioxide, dimethylsulfoxide, and sulfolane; and other miscellaneous solvents such as acetone, dichloromethane, nitromethane, nitrobenzene, and propylene carbonate.

The concentration of the supporting electrolyte used in the electrolytic solution ranges from 0.01 to 30%, preferably from 0.1 to 5%, by weight.

The electrolytic polymerization is effected by passing D.C. current between the CF and the electrolytic solution containing the reactive monomer, where the current density ranges generally from 0.01 to 20 $A/dm^2$, preferably from 0.1 to 2 $A/dm^2$, and the voltage is generally about 5-about 25 V. The current density, when excessively low, results in unfavorably low rate of polymerization and, when excessively high, undesirably causes degradation of the CF. The reaction period ranges approximately from 0.1 second to 5 hours, and the reaction temperature approximately from $-50°$ to $100°$ C., preferably from $0°$ to $80°$ C. The reaction temperatures in individual cases are suitably chosen depending upon the reactive monomer used, where it is important to choose such temperatures as to supress the thermal polymerization to a negligible degree. If the electrolytic polymerization is carried out at such high temperatures as to cause marked thermal polymerization, the cohesive strength and uniformity of the resulting composition will be impaired. In this invention, the produced composition can be dried in a wide temperature range of approximately from $10°$ to $300°$ C., preferably from $30°$ to $200°$ C.

The interaction between the CF surface and the polymer in the novel polymer composition of this invention is stronger than the physical interaction in the cases of simple van der Waals adsorption and the like. This is supported by the fact that a large amount of unextracted polymer is found after extraction of the present composition with a good solvent of the polymer.

The novel polymer composition of this invention is useful for a wide variety of applications, e.g. aircraft, space vehicles, sporting and recreation goods, automobiles, audio, and general industrial uses.

BRIEF DESCRIPTION OF THE DRAWING

The accompanying drawing is an illustration showing a preferred embodiment of the device for electrolytic polymerization on a CF roving according to this invention. Numerals in the drawing denote the following:

1—Electrode rollers (made of copper)
2—Guide rollers (made of glass)
3—CF roving
4—Electrolytic solution
5—Reaction vessel (made of stainless steel)
6—DC generator
7—Rheostat
8—Ammeter This invention is illustrated in more detail with reference to the following Examples, wherein "parts" are all by weight.

EXAMPLES 1-2 AND COMPARATIVE EXAMPELS 1-3

A roving of PAN-derived high-tenacity CF (made by Mitsubishi Rayon Co., Ltd.) was set in an electrolytic polymerization reactor (made of stainless steel), as shown in the drawing, provided with copper electrode rollers and glass guide rollers. An electrolytic solution prepared by dissolving 50 g of a polyethylene glycol (n=4) diglycidyl ether (tradename: Denacol EX-821, made by Nagase Sangyo Co., Ltd.) as an aliphatic epoxy compound and 25 g of sodium nitrate as a supporting electrolyte in 500 g of DMF was poured into the reactor to immerse the CF roving.

Then, direct current was supplied from a D.C. generator to flow between the CF which is made to act as anode, and the electrolytic solution, thereby carrying out the electrolytic polymerization of the epoxy compound at room temperature for one hour. During the electrolysis, the current density was adjusted to 0.27 $A/dm^2$ by means of a rheostat.

The product roving was thoroughly washed with DMF and dried in a stream of 100° C. hot air. Then, the binding state of the CF and the amount of polymer deposit on the CF were examined, where the latter was determined by weighing.

The same polymerization procedure was repeated by using a mixed monomer consisting of 25 g EX-821 and 25 g of methyl methacrylate (MMA) and the product was examined as the above.

For the purpose of comparison, electrolytic polymerization and product evaluation were conducted in the same manner but using separately MMA, which is a usual vinyl monomer; polyethylene glycol (average molecular weight 300), which has no epoxy functional group; and a mixture of MMA and the same polyethylene glycol in place of the reactive monomer of this invention.

Results of these Examples and Comparative Examples are shown in Table 1. It is evident from the Table that; as in Comparative Example 2, polyethylene glycol itself exhibits no polymerization activity and as in Comparative Example 1, the CF binding state is considerably inferior and the amount of the polymer deposit on the CF is extremely limited; in contrast to this, according to the production process of this invention, an excellent CF binding state and a much increased amount of polymer deposit are obtained, thus markedly improving the practical value of the product composition.

TABLE 1

|  | Denacol*1 EX-821 | MMA*2 | Polyethylene glycol*3 | CF*4 (part) |
|---|---|---|---|---|
| Example 1 | 50 | — | — | 0.123 |
| Example 2 | 25 | 25 | — | " |
| Comparative Example 1 | — | 50 | — | " |
| Comparative Example 2 | — | — | 50 | " |
| Comparative Example 3 | — | 25 | 25 | " |

|  | Supporting electrolyte Sodium nitrate (parts) | Solvent DMF*5 (parts) | Reaction product*6 | |
|---|---|---|---|---|
|  |  |  | CF*7 binding state | Amount*8 of polymer deposit on CF (parts) |
| Example 1 | 2.5 | 500 | ⊚ | 72 |
| Example 2 | " | " | ⊚ | 69 |
| Comparative Example 1 | " | " | x | 7 |
| Comparative Example 2 | " | " | xx | 0 |
| Comparative Example 3 | " | " | x | 2 |

Note:
*1An aliphatic epoxy compound made by Nagase Sangyo Co., Ltd.
*2MMA: Methyl methacrylate
*3An aliphatic ether
*4A roving of PAN-derived high-tenacity CF made by Mitsubishi Rayon Co., Ltd.
*5DMF: N,N—Dimethylformamide
*6Reaction conditions
Temperature: 25° C.
CF polarity: Positive (anode)
Current density: 0.27 A/dm²
Voltage: 20 V
Period of electrolysis: 60 minutes
*7CF binding state
⊚very good
x inferior
xx much inferior
*8Based on 100 parts of charged CF.

EXAMPLES 3–7

In the same manner as in Example 1 but using separately aliphatic epoxy compounds: Denacol's EX-810, EX-840, EX-314, EX-611, and EX-321 as the reactive monomer, in place of Denacol EX-821, electrolytic polymerization was conducted, and amounts of polymer deposit of CF were examined. Results thereof are shown in Table 2 comparing with those of Example 1.

TABLE 2

| Reactive monomer | | | Supporting electrolyte | Solvent | Amount of*1 polymer |
|---|---|---|---|---|---|
| Aliphatic epoxy compound | Amount (parts) | CF (part) | Sodium nitrate (parts) | DMF (parts) | deposit on CF (parts) |
| Example 1 Denacol*2 EX-821 | 50 | 0.123 | 2.5 | 500 | 72 |
| Example 3 Denacol*3 EX-810 | " | " | " | " | 61 |
| Example 4 Denacol*4 EX-840 | " | " | " | " | 79 |
| Example 5 Denacol*5 EX-314 | " | " | " | " | 42 |
| Example 6 Denacol*6 EX-611 | " | " | " | " | 50 |
| Example 7 Denacol*7 EX-321 | " | " | " | " | 55 |

Notes:
*1Based on 100 parts of charged CF.
*2Denacol EX-821:

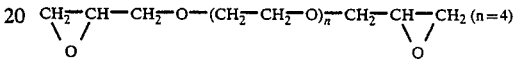

*3Denacol EX-810:

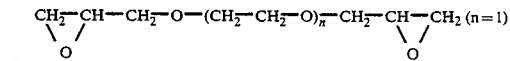

*4Denacol EX-840:

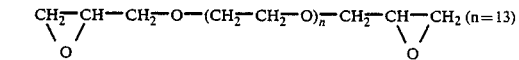

*5Denacol EX-314:

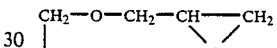

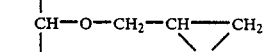

*6Denacol EX-611:

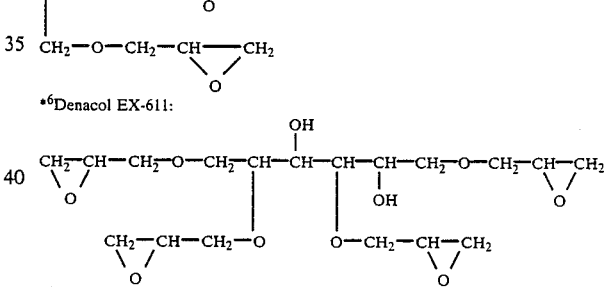

*7Denacol EX-321:

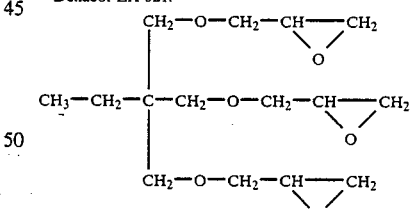

As is evident from Table 2, the amount of polymer deposited on CF was considerably large in the cases of EX-821, EX-810, and EX-840 and was on somewhat lower levels in the cases of EX-314, EX-611, and EX-321.

In the next place, the percentage of polymer extracted from the product was determined on the CF-polymer composites obtained in Examples 1–7, by weighing out about 0.1 g of each composition together with a cylindrical filter paper and subjecting the composition sample to Soxhlet extraction with chloroform for 24 hours. For comparison, the same test was conducted on a composition (Comparative Example 4) prepared by a bulk polymerization in the presence of the same CF roving using a common radical polymerization initiator. Results of the test are shown in Table 3. As can be seen therefrom, whereas the polymer in the composition of Comparative Example 4 was completely extracted out by the 24-hour extraction, very low percentages of polymers were extracted from the compositions prepared according to this invention, that is, most of the polymers were firmly bonded to CF without being extracted.

TABLE 3

| | Polymerization process | Amount of polymer deposit on CF (parts)*2 | Percentage of polymer extracted with chloroform for 24 hours |
|---|---|---|---|
| Example 1 | Process of this invention using Denacol EX-821 as reactive monomer | 72 | 3 |
| Example 2 | Process of this invention using a mixture of Denacol EX-821 and MMA as reactive monomer | 69 | 4 |
| Example 3 | Process of this invention using Denacol EX-810 as reactive monomer | 61 | 3 |
| Example 4 | Process of this invention using Denacol EX-840 as reactive monomer | 79 | 3 |
| Example 5 | Process of this invention using Denacol eX-314 as reactive monomer | 42 | 5 |
| Example 6 | Process of this invention using Denacol EX-611 as reactive monomer | 50 | 6 |
| Example 7 | Process of this invention using Denacol EX-321 | 55 | 7 |
| Comparative Example 4 | Bulk polymerization using DDS*1 as initiator as reactive monomer | 95 | 100 |

Notes:
*1DDS: Diaminodiphenylsulfone
*2Based on 100 parts of charged CF

EXAMPLE 8

Electrolytic polymerization was conducted in the same manner by using different kinds of CF. Results of evaluating the product composition are shown in Table 4.

TABLE 4

| No. | CF | Nature of fiber | Average diameter of monofilament (μ) | Amount of*3 polymer deposit on CF (parts) | Percentage of polymer extracted with chloroform for 24 hours |
|---|---|---|---|---|---|
| 1 | From pitch*1 (T-101S) | Carbonaceous | 12.5 | 75 | 3 |
| 2 | From pitch*1 (T-201S) | Graphitic | " | 70 | 5 |
| 3 | From PAN*2 (HT) | Carbonaceous | " | 72 | 3 |
| 4 | From PAN*2 (HM) | Graphitic | " | 71 | 6 |

Notes:
*1Krecatow made by Kureha Chem. Ind. Co., Ltd.
*2Made by Mitsubishi Rayon Co., Ltd.
*3Conditions of electrolytic polymerization CF, 0.123 part; Sodium nitrate, 25 parts; DMF, 500 parts; EX-821, 50 parts As can be seen from Table 4, in the process of this invention, no dependency on the kind of CF was observed of polymerization activity, amounts of polymer deposited on CF were generally satisfactory, and percentages of polymer extracted from the product composition were low, that is, most of the polymers were firmly bonded to CF without being extracted.

EXAMPLE 9

Electrolytic polymerization was conducted in the same manner as in Example 1 but using each reactive comonomer (25 g) shown in Table 5 together with Denacol EX-821 (25 g). Results of evaluating the product composition are shown in Table 5.

TABLE 5

| Run No. | Reactive comonomer Kind | Amount (parts) | Supporting electrolyte NaNO3 (parts) | PAN-derived CF (part) | Solvent DMF (parts) | Polarity of CF during electrolysis | Amount of*5 polymer deposit on CF (parts) |
|---|---|---|---|---|---|---|---|
| 1 | MMA | 25 | 2.5 | 0.123 | 500 | anode | 80 |
| 2 | ST*1 | " | " | " | " | " | 58 |
| 3 | Vinyl acetate | " | " | " | " | " | 65 |
| 4 | BuA*2 | " | " | " | " | " | 72 |
| 5 | MAA*3 | " | " | " | " | " | 70 |
| 6 | GMA/MAA*4 | " | " | " | " | " | 95 |
| 7 | GMA/BuA | " | " | " | " | " | 90 |

Notes:
*1ST: Styrene monomer
*2BuA: n-Butyl acrylate
*3MAA: Methacrylic acid
*4GMA: Glycidyl methacrylate
*5Based on 100 parts of charged CF.

Weight ratio of one comonomer to the other in the run Nos. 6 and 7 was 50:50.

As is evident from Table 5, any usual vinyl monomer radical-polymerizable can be used as a reactive comonomer in this invention.

EXAMPLE 10

A roving (0.123 g) of PAN-derived CF (HT, made by Mitsubishi Rayon Co., Ltd.) was immersed in a solution prepared by dissolving 250 g of sodium nitrate as a supporting electrolyte in 500 g of demineralized water. After being thoroughly dried, the treated CF was all immersed in an electrolytic solution (50 g of Denacol EX-821 in 500 g of DMF) contained in the reactor of the same electrolytic polymerization apparatus as used in Example 1. Then, direct current from the D.C. generator was flowed between the CF acting as anode and the electrolytic solution, thereby carrying out the electrolytic polymerization at room temperature for one hour. During the electrolysis, the current density was adjusted to 0.27 A/dm² by means of the rheostat.

The product composition was evaluated in the same manner as in Example 1. The results showed that the amount of polymer deposit on the CF was 60 parts and the polymer produced from the reactive monomer was bonded uniformly and firmly to the CF surface.

EXAMPLE 11

A unidirectional composite was prepared from a CF-polymer composition obtained from a mixture of 1,000 parts of Denacol EX-821, 24.6 parts of CF, 50 parts of sodium nitrate and 100,000 parts of DMF according to the present invention and a general-purpose epoxy resin of bisphenol A type, and was shaped into test pieces, which were then measured for mechanical properties such as strand strength, inter-laminar shear strength, and flexural strength. For comparison, another unidirectional composite (simple blend) was similarly prepared by using untreated CF and evaluated. Results are shown in Table 6.

TABLE 6

| Unidirection composite | Mechanical properties | | |
|---|---|---|---|
| | Strand strength kg/mm² | Inter-*¹ laminar shear strength kg/mm² | Flexural*¹ strength kg/mm² |
| Blend of CF-polymer composition of this invention with epoxy resin | 404 | 9.90 | 189.2 |
| Simple blend of untreated CF with epoxy resin | 340 | 7.30 | 148.1 |

Note:
*¹CF content 60 vol. %

Table 6 indicates that the CF-polymer composition of this invention exhibits excellent mechanical properties in practical applications.

EXAMPLES 12-13 AND COMPARATIVE EXAMPLES 5-7

A roving of PAN-derived high-tenacity CF was set in the stainless steel reactor of an electrolytic polymerization apparatus, as shown in the drawing, provided with electrode rollers and guide rollers. An electrolytic solution prepared by dissolving 50 g of bis(3,4-epoxy cyclohexyl)methyl adipate as an alicyclic epoxy compound and 25 g of sodium nitrate as a supporting electrolyte in 500 g of DMF was poured into the reactor to immerse the CF roving.

Then, direct current from a D.C. generator was flowed between the CF as anode and the electrytic solution, thereby carrying out the electrolytic polymarization at room temperature for one hour. During the electrolysis, the current density was adjusted to 0.27 A/dm² by means of a rheostat.

The product roving was thoroughly washed with DMF and dried in a stream of 100° C. hot air. Then, the binding state of the CF and the amount of polymer deposited on the CF were examined, where the latter was determined by weighing.

In the same manner, electrolytic polymerization was carried out by using a mixture of 25 g of the above alicyclic epoxy compound and 25 g of methyl methacrylate (MMA) and the product was evaluated.

For comparison, electrolytic polymerization and product evaluation were conducted in the same manner but using separately MMA, which is a usual vinyl monomer; ethyl glycidate,

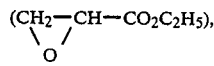

which is a noncylic monofunctional aliphatic epoxy compound; and a mixture of MMA and ethyl glycidate; as a reactive monomer.

Results of these Examples and Comparative Examples are shown in Table 7. As is evident from Table 7, the CF binding state is inferior and the amount of polymer deposited on CF is extremely limited, in Comparative Examples 5, 6, and 7; in contrast to this, an excellent CF binding state and a much increased amount of polymer deposit are obtained, according to the process of this invention, thus markedly improving the practicality.

TABLE 7

| | Reactive monomer (parts) | | | CF*⁴ (part) | Supporting electrolyte Sodium nitrate (parts) | Solvent DMF*⁵ (parts) | Reaction product*⁶ | |
|---|---|---|---|---|---|---|---|---|
| | ERL-*¹ 4299 | MMA*² | Ethyl*³ glycidate | | | | CF*⁷ binding state | Amount of*⁸ polymer deposit on CF (parts) |
| Example 12 | 50 | — | — | 0.123 | 2.5 | 500 | ⊚ | 105 |
| Example 13 | 25 | 25 | — | " | " | " | ⊚ | 88 |
| Comparative Example 5 | — | 50 | — | " | " | " | x | 3 |
| Comparative Example 6 | — | — | 50 | " | " | " | x | 5 |
| Comparative | — | 25 | 25 | " | " | " | xx | 4 |

TABLE 7-continued

| | Reactive monomer (parts) | | | | Supporting electrolyte Sodium nitrate (parts) | Solvent DMF*5 (parts) | Reaction product*6 | |
|---|---|---|---|---|---|---|---|---|
| | ERL-*1 4299 | MMA*2 | Ethyl*3 glycidate | CF*4 (part) | | | CF*7 binding state | Amount of*8 polymer deposit on CF (parts) |
| Example 7 | | | | | | | | |

Notes:

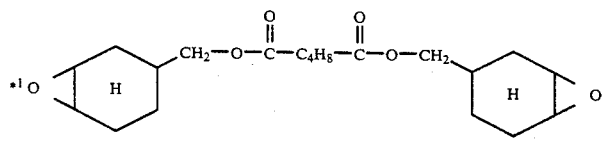

*1 (manufactured by Union Carbide Corp.)
*2 MMA: Methyl methacrylate
*3 Monofunctional aliphatic epoxy compound

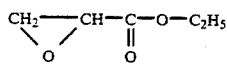

*4 PAN-derived high-tencity CF made by Mitsubishi Rayon Co., Ltd.
*5 DMF: N,N—dimethylformamide
*6 Reaction conditions
Temperature: 25° C.
CF polarity: Positive (anode)
Current density: 0.27 A/dm$^2$
Voltage: 20 V
Period of electrolysis: 60 minutes
*7 CF binding state
⊚ very good
X inferior
XX much inferior
*8 Based on 100 parts of charged CF.

EXAMPLES 14-16

Polymerization was conducted in the same manner as in Example 12 but using separately the alicyclic epoxy compounds shown in Table 8 as an reactive monomer, and amounts of polymer deposited on CF were examined. Results there of together with those of Example 12 are shown in Table 8.

TABLE 8

| | Reactive monomer | | | Supporting electrolyte | | Amount of*1 |
|---|---|---|---|---|---|---|
| | Alicyclic epoxy compound | Amount (parts) | CF (part) | Sodium nitrate (parts) | Solvent DMF (parts) | polymer deposit on CF |
| Example -12 | A*2 | 50 | 0.123 | 2.5 | 500 | 105 |
| Example -14 | B*3 | " | " | " | " | 101 |
| Example -15 | C*4 | " | " | " | " | 97 |
| Example -16 | D*5 | " | " | " | " | 90 |

Notes:
*1 Based on 100 parts of charged CF.
*2 A: Bis [(3,4-epoxy cyclohexyl)methyl] adipate $$\text{structure}$$

*3 B: 2-(3,4-Epoxycyclohexyl-5,5-spiro-3,4-epoxy)cyclohexane-m-dioxane

*4 C: (3,4-Epoxycyclohexyl)methyl 3,4-epoxy-cyclohexanecarboxylate

*5 D: Vinylcyclohexene dioxide

As can be seen from Table 8, the amount of polymer deposited on CF was on high levels for both the polyfunctional alicyclic epoxy compounds.

Then, the percentage of polymer extraction from the product was determined on the CF-polymer composition of CF. Results of evaluating the product compositions are shown in Table 10.

TABLE 10

| Run No. | CF | Nature of fiber | Average diameter of monofilament (μ) | Amount of polymer deposit on CF (parts) | Percentage of polymer extreated with chloroform for 24 hours |
|---|---|---|---|---|---|
| 1 | From pitch | Carbonaceous | 12.5 | 109 | 2 |
| 2 | " | Graphitic | " | 100 | 3 |
| 3 | From PAN | Carbonaceous | " | 105 | 2 |
| 4 | " | Graphitic | " | 102 | 5 |

Conditions of electrolytic polymerization:
CF, 0.123 part; sodium nitrate, 2.5 parts;
BRL-4290, 50 parts; DMF, 500 parts tions obtained in Examples 12–16, by weighing about 0.1 g of each composition together with a cylindrical filter paper and subjecting the composition sample to a Soxhlet extraction with chloroform for 24 hours. For comparison, the same test was conducted on a composition (Comparative Example 8) prepared by a bulk polymerization in the presence of the same CF roving using a common polymerization initiator. Results of the tests are shown in Table 9. Therefrom it can be seen that, whereas the polymer in the composition of Comparative Example 8 was completely extracted by the 24 hour-extraction, those in the compositions obtained by the process of this invention were extracted in low percentages, that is, most of the polymers were firmly bonded without being extracted.

As can be seen from Table 10, in the process of this invention, no dependency on the kind of CF was observed of polymerization activity, amounts of polymer deposit on CF were generally satisfactory, and percentages of polymer extracted from the product compositions were low, that is, most of the polymers were firmly bonded to CF without being extracted.

EXAMPLE 18

Electrolytic polymerization was conducted in the same manner as in Example 13 but using each of the monomers shown in Table 11, as a reactive monomer copolymerizable with the alicyclic epoxy compound. Results of evaluating the product compositions are shown in Table 11.

TABLE 9

| | Polymerization process | Amount of polymer*1 deposited on CF (parts) | Percentage of polymer extracted with chloroform for 24 hours |
|---|---|---|---|
| Example 12 | Process of this invention using A as reactive monomer | 105 | 2 |
| Example 13 | Process of this invention using a mixture of A and MMA as reactive monomer | 88 | 3 |
| Example 14 | Process of this invention using B as reactive monomer | 101 | 2 |
| Example 15 | Process of this invention using C as reactive monomer | 97 | 4 |
| Example 16 | Process of this invention using D as reactive monomer | 98 | 5 |
| Comparative Example 8 | Bulk polymerization | 98 | 100 |

Note:
*1 Based on 100 parts of charged CF

EXAMPLE 17

Electrolytic polymerization was conducted in the same manner as in Example 12 but using different kinds

TABLE 11

| No. | Reactive comonomer | Amount of reactive comonomer added (parts) | Supporting electrolyte Sodium nitrate (parts) | PAN-derived CF (part) | Solvent DMF (parts) | Polarity of CF during electrolytic polymerization | Amount of polymer deposit on CF (parts) |
|---|---|---|---|---|---|---|---|
| 1 | MMA | 25 | 2.5 | 0.123 | 500 | anode | 125 |
| 2 | ST | " | " | " | " | " | 103 |
| 3 | Vinyl acetate | " | " | " | " | " | 110 |
| 4 | BuA | " | " | " | " | " | 117 |
| 5 | MAA | " | " | " | " | " | 115 |
| 6 | GMA/MAA | " | " | " | " | " | 140 |
| 7 | GMA/BuA | " | " | " | " | " | 135 |

As is evident from Table 11, any usual vinyl monomer radical-polymerizable can be used as a reactive comonomer in this invention.

EXAMPLE 19

A roving (0.123 g) of PAN-derived CF (HT, made by Mitsubishi Rayon Co., Ltd.) was immersed in a solution prepared by dissolving 250 g of sodium nitrate as a supporting electrolyte in 500 g of demineralized water. After being thoroughly dried, the treated CF was all immersed in an electrolytic solution (50 g of ERL-4299 in 500 g of DMF) contained in the reactor of the same electrolytic polymerization apparatus as used in Example 12. Then, direct current from the D.C. generator was flowed between the CF as anode and the electrolytic solution, thereby carrying out the electrolytic polymerization at room temperature for one hour. During the electrolysis, the current density was adjusted to 0.27 A/dm$^2$ by means of the rheostat.

The product composition was evaluated in the same manner as in Example 12. The results showed that the amount of polymer deposited on the CF was 80 parts per 100 parts of CF and the polymer produced from the reactive monomer was bonded uniformly and firmly to the CF surface.

EXAMPLE 20

A unidirectional composite was prepared from a CF-polymer composition obtained from a mixture of 1,000 parts of a reactive monomer ERL-4299, 24.6 parts of CF, 50 parts of sodium nitrate and 100,000 parts of DMF according to the present invention and a general-purpose epoxy resin of bisphenol A type, and was measured for its mechanical properties such as strand strength, inter-laminar shear strength, and flexural strength. For comparison, another unidirectional composite (simple blend) was similarly prepared by using untreated CF and evaluated. Results are shown in Table 12.

TABLE 12

| | Mechanical properties | | |
|---|---|---|---|
| | Strand strength kg/mm$^2$ | Inter-[1] laminar shear strength kg/mm$^2$ | Flexural[1] strength kg/mm$^2$ |
| Blend of the CF-polymer composition of this invention with epoxy resin | 428 | 11.80 | 193.3 |
| Simple blend of CF with epoxy resin | 365 | 7.50 | 152.0 |

[1]CF content, 60 vol. %

Table 12 indicates that the CF-polymer composition of this invention exhibits excellent mechanical properties in practical applications.

EXAMPLES 21-22 AND COMPARATIVE EXAMPLES 9-11

A roving of PAN-derived high-tenacity CF was set in the reactor of an electrolytic polymerization apparatus, as shown in the drawing, provided with electrode rollers and guide rollers. An electrolytic solution prepared by dissolving 50 g of isopropoxytitanium triisostearate (TTS, made by Toyo Soda Co., Ltd.) as an organic titanate and 25 g of sodium nitrate as a supporting electrolyte in 500 g of DMF was poured into the reactor to immerse the CF roving.

Then, the electrolytic polymerization was effected at room temperature for one hour by flowing direct current between the CF as anode and the electrolytic solution from a D.C. generator. During the electrolysis, the current density was adjusted to 0.27 A/dm$^2$ by means of a rheostat.

The product roving was thoroughly washed with DMF and dried in a stream of 100° C. hot air. Then, the binding state of the CF and the amount of polymer deposited on the CF were examined, where the latter was determined by weighing.

The above procedure was repeated by using a mixture of TTS and 25 g of MMA.

For comparison, the above procedure was further repeated by using separately MMA, which is a usual vinyl monomer; tetrapropyltitanium, which is an organo titanium compound having no alkoxyl group; and a mixture of MMA and tetrapropyltitanium; as a reactive monomer. These products were similarly examined. Results thereof are shown in Table 13.

As is evident from Table 13, the CF binding state is inferior and the amount of polymer deposited on CF is extremely limited, in Comparative Examples 9, 10, and 11; in contrast to this, an excellent CF binding state and a much increased amount of polymer deposit are obtained, according to the process of this invention, thus markedly improving the practicality.

TABLE 13

| | Reactive monomer (parts) | | | | Supporting electrolyte | | Reduction product[1] | |
|---|---|---|---|---|---|---|---|---|
| | TTS | MMA | Tetra-propyl-titanium | CF (part) | Sodium nitrate (parts) | Solvent DMF (parts) | CF[2] binding state | Amount of[3] polymer deposited on CF (parts) |
| Example 21 | 50 | — | — | 0.123 | 2.5 | 500 | ⊚ | 82 |
| Example 22 | 25 | 25 | — | " | " | " | ⊚ | 70 |
| Comparative Example 9 | — | 50 | — | " | " | " | X | 5 |
| Comparative Example 10 | — | — | 50 | " | " | " | XX | 0 |
| Comparative Example 11 | — | 25 | 25 | " | " | " | XX | 3 |

TABLE 13-continued

| | Reactive monomer (parts) | | | Supporting electrolyte | | Reduction product*1 | |
|---|---|---|---|---|---|---|---|
| | TTS | MMA | Tetra-propyl-titanium | CF (part) | Sodium nitrate (parts) | Solvent DMF (parts) | CF*2 binding state | Amount of*3 polymer deposited on CF (parts) |

Example 11

Notes:
*1 Reaction conditions
Temperature: 25° C.
CF polarity: Positive (anode)
Current density: 0.27 A/dm²
Voltage: 20 V
Period of electrolysis: 60 minutes
*2 CF binding state
⊚ very good
X inferior
XX much inferior
*3 Based on 100 parts of charged CF.

EXAMPLES 23–25

Polymerization was conducted in the same manner as in Example 21 but using separately tetrastearyl titanate (TST), tetraoctyl titanate (TOT), and tetra-n-butyl titanate [B-1(TBT)] (all made by Toyo Soda Co., Ltd.) as an reactive monomer in place of TTS, and amounts of polymer deposits on CF were examined. Results thereof together with those of Example 21 are shown in Table 14.

TABLE 14

| | Reactive monomer | | CF (part) | Supporting electrolyte Sodium nitrate (parts) | Solvent DMF (parts) | Amount of polymer deposit on CF (parts) |
|---|---|---|---|---|---|---|
| | Organic titanate | Amount (parts) | | | | |
| Example 21 | TTS*2 | 50 | 0.123 | 2.5 | 500 | 82 |
| Example 23 | TST*3 | " | " | " | " | 77 |
| Example 24 | TOT*4 | " | " | " | " | 71 |
| Example 25 | B-1*5 (TBT) | " | " | " | " | 65 |

Notes:
*1 Based on 100 parts of charged CF.
*2 TTS: $Ti(O-iso-C_3H_7)(OCC_{17}H_{35})_3$ (with C=O)
*3 TST: $Ti(O-C_{17}H_{35})_4$
*4 TOT: $Ti(O.CH_2.CH.C_4H_9)_4$ with $C_2H_5$ branch
*5 B-1(TBT): $Ti(O-n.C_4H_9)_4$ As can be seen from Table 14, the amount of polymer deposited on CF was on high levels for all the organic titanates.

Then, the percentage of polymer extraction was determined on the CF-polymer compositions obtained in Examples 21–25, by weighing out about 0.1 g of each composition together with a cylindrical filter paper and subjecting the composite sample to Soxhlet extraction with chloroform for 24 hours. Results of the tests are shown in Table 15. Therefrom it has proved that the polymers in the compositions obtained by the process of this invention are for the most part bonded firmly to CF without being extracted.

TABLE 15

| | Amount of polymer deposit on CF (parts)*1 | Percentage of polymer extracted with chloroform for 24 hours (%) |
|---|---|---|
| Example 21 | 82 | 6 |
| Example 22 | 70 | 8 |
| Example 23 | 77 | 7 |
| Example 24 | 71 | 8 |
| Example 25 | 65 | 9 |

Note:
*1 Based on 100 parts of charged CF

EXAMPLE 26

Electrolytic polymerization was conducted in the same manner as in Example 21 but using different kinds of CF. Results of evaluating the product compositions are shown in Table 16.

TABLE 16

| Run No. | CF | Nature of fiber | Average diameter of monofilament (μ) | Amount of*1 polymer deposited on CF (parts) | Percentage of polymer extracted with chloroform for 24 hours |
|---|---|---|---|---|---|
| 1 | From pitch | Carbonaceous | 12.5 | 85 | 7 |
| 2 | From pitch | Graphitic | " | 70 | 9 |
| 3 | From PAN | Carbonaceous | " | 82 | 6 |
| 4 | From | Graphitic | " | 78 | 9 |

TABLE 16-continued

| Run No. | Nature of CF PAN fiber | Average diameter of monofilament ($\mu$) | Amount of[*1] polymer deposited on CF (parts) | Percentage of polymer extracted with chloroform for 24 hours |
|---|---|---|---|---|

Note:
[*1]Conditions of electrolytic polymerization:
CF, 0.123 part; sodium nitrate, 2.5 parts; TTS, 50 parts; DMF, 500 parts As is evident from Table 16, in the process of this invention, no dependency of the kind of CF was observed of polymerization activity, amounts of polymer deposited on CF were generally satisfactory, and percentages of polymer extracted from the product compositions were low indicating that most of the polymers were firmly bonded to CF without being extracted.

EXAMPLE 27

Electrolytic polymerization was conducted in the same manner as in Example 22 but using 25 g of the organic titanate and 25 g each of the comonomers shown in Table 17 as a reactive monomer copolymerizable with the organic titanate. Results of evaluating the product compositions are shown in Table 17.

TABLE 17

| No. | Reactive comonomer | Amount (parts) | Supporting electrolyte Sodium nitrate (parts) | PAN-derived CF (part) | Solvent DMF (parts) | Polarity of CF during electrolytic polymerization | Amount of polymer deposit on CF (parts) |
|---|---|---|---|---|---|---|---|
| 1 | MMA | 25 | 2.5 | 0.123 | 500 | anode | 89 |
| 2 | ST | " | " | " | " | " | 67 |
| 3 | Vinyl acetate | " | " | " | " | " | 74 |
| 4 | BuA | " | " | " | " | " | 81 |
| 5 | MAA | " | " | " | " | " | 79 |
| 6 | GMA/MAA | " | " | " | " | " | 104 |
| 7 | GMA/BuA | " | " | " | " | " | 99 |

As is evident from Table 17, any usual vinyl monomer radical-polymerizable can be used as a reactive comonomer in this invention.

EXAMPLE 28

A roving (0.123 g) of PAN-derived CF was immersed in a solution prepared by dissolving 250 g of sodium nitrate as a supporting electrolyte in 500 g of demineralized water. After being thoroughly dried, the treated CF was all immersed in an electrolytic solution (TTS in 500 g of DMF) contained in the reactor of the same electrolytic polymerization apparatus as used in Example 21. Then, direct current from the D.C. generator was flowed between the CF as anode and the electrolytic solution, thereby carrying out the electrolytic polymerization at room temperature for one hour. During the electrolysis, the current density was adjusted to 0.27 A/dm² by means of the rheostat.

The product composition was evaluated in the same manner as in Example 21. The results showed that the amount of polymer deposited on the CF was 71 parts per 100 parts of CF and the polymer was bonded uniformly and firmly to the CF surface.

The thus obtained CF-polymer composition was extended into a sheet so as to align unidirectionally and was impregnated with a general-purpose epoxy resin of bisphenol A type. The resulting composite sheet was shaped into test pieces, which were then measured for mechanical properties such as strand strength, interlaminar shear strength, and flexural strength. For comparison, another composite sheet (simple blend) was similarly prepared by using untreated CF and evaluated. Results are shown in Table 18.

TABLE 18

| | Mechanical properties | | |
|---|---|---|---|
| | Strand strength kg/mm² | Inter-[*1] laminar shear strength kg/mm² | Flexural[*1] strength kg/mm² |
| Blend of the CF-polymer composition of this invention with epoxy resin | 419 | 11.00 | 190.0 |
| Simple-blend of CF with epoxy resin | 365 | 7.50 | 152.0 |

[*1]CF content 60 Vol %

Table 18 indicates that the CF-polymer composition of this invention exhibits excellent mechanical properties in practical applications.

EXAMPLES 29-30 AND COMPARATIVE EXAMPLES 13-15

A roving of PAN-derived high-tenacity CF (made by Mitsubishi Rayon Co., Ltd.) was set in the stainless steel reactor of an electrolytic polymerization apparatus, as shown in the drawing, provided with copper electrode rollers and glass guide rollers. An electrolytic solution prepared by dissolving 50 g of vinyl-tris($\beta$-methoxyethoxy)silane (KBC 1003, made by Shinetsu Chem. Ind. Co., Ltd.) as a vinylsilane compound and 25 g of sodium nitrate as a supporting electrolyte in 500 g of DMF was poured into the reactor to immerse the CF roving.

Then, direct current from a D.C. generator was flowed between the CF as anode and the electrolytic solution, thereby carrying out the electrolytic polymerization at room temperature for one hour. During the electrolysis, the current density was adjusted to 0.27 A/dm² by means of a rheostat.

The product roving was throughly washed with DMF and dried in a stream of 100° C. hot air. Then the binding state of the CF and the amount of polymer deposited on the CF were examined, where the latter was determined by weighing.

The above procedure was repeated by using mixture of 25 g of KBC 1003 and 25 g of MMA. For comparison, the above procedure was further repeated by using separately MMA, which has no silicon atom; trimethylethoxysilane, which is a saturated silane having no double bond; and a mixture of MMA and trimethylethoxysilane; as a reactive monomer. These products were similarly examined. Results thereof are shown in Table 19.

As is evident from Table 19, saturated silane as used in Comparative Example 14 exhibits no polymerization activity; when MMA used singly as in Comparative Example 13, the CF binding state is considerably inferior and the amount of polymer deposited on the CF is extremely limited; in contrast, according to the process of this invention, an excellent CF binding state and a much increased amount of polymer deposited on CF are obtained, thus markedly improving the practical value.

methoxyethoxy)silane, and amounts of polymer deposited on CF were examined. Results thereof are shown in Table 20 comparing with those of Example 29.

TABLE 20

|  | Reactive monomer | Amount (parts) | CF (parts) | Supporting electrolyte Sodium nitrate (parts) | Solvent DMF (parts) | Amount of polymer deposited on CF (parts) |
|---|---|---|---|---|---|---|
|  | Vinylsilane |  |  |  |  |  |
| Example 29 | Vinyl-tris(β-methoxyethoxy)-silane | 50 | 0.123 | 2.5 | 500 | 58 |
| Example 31 | Vinyltriethoxy-silane | " | " | " | " | 50 |
| Example 32 | γ-Methacryloxy-propyltrimethoxy-silane | " | " | " | " | 52 |
| Example 33 | Vinyl-tripropoxy-silane | " | " | " | " | 32 |
| Example 34 | Vinyl-tris(β-methoxypropoxy)-silane | " | " | " | " | 42 |
| Example 35 | γ-Methacryloxy-butyltrimethoxy-silane | " | " | " | " | 28 |

*[1]Based on 100 parts of charged CF

As shown in Table 20, the amount of polymer deposited on CF was fairly large for vinyl-tris(β-methoxyethoxy)-silane, vinyltriethoxysilane, and γ-methacryloxypropyltrimethoxysilane and on somewhat lower levels for vinyltripropoxysilane and γ-methacryloxybutyltrimethoxysilane.

Then, the percentage of polymer extraction was determined on the CF-polymer compositions obtained in Examples 29-35, by weighing out about 0.1 g of each

TABLE 19

|  | Reactive monomer (parts) | | | CF*[4] (part) | Supporting electrolyte Sodium nitrate (parts) | Solvent DMF*[5] (parts) | Reaction product*[6] | |
|---|---|---|---|---|---|---|---|---|
|  | KBC-*[1] 1003 | MMA*[2] | Tri-*[3] methyl-ethoxy-silane |  |  |  | CF*[7] binding state | Amount of*[8] polymer deposited on CF (parts) |
| Example 29 | 50 | — | — | 0.123 | 2.5 | 500 | ⓞ | 58 |
| Example 30 | 25 | 25 | — | " | " | " | ⓞ | 55 |
| Comparative Example 13 | — | 50 | — | " | " | " | X | 7 |
| Comparative Example 14 | — | — | 50 | " | " | " | X | 1 |
| Comparative Example 15 | — | 25 | 25 | " | " | " | X | 3 |

Notes:
*[1]Vinyl-tris (β-methoxyethoxy) silane (a vinylsilane, made by Shinetsu Chem. Ind. Co., Ltd.)
*[2]MMA: Methyl methacrylate
*[3]A saturated silane
*[4]A roving of PAN-derived high-tenacity CF (made by Mitsubishi Rayon Co., Ltd.)
*[5]DMF: N,N—Dimethylformamide
*[6]Reaction conditions
Temperature: 25° C.
CF polarity: Positive (anode)
Current density: 0.27 A/dm²
Voltage: 20 V
Period of electrolysis: 60 minutes
*[7]CF binding state
ⓞ very good
X inferior
XX much inferior
*[8]Based on 100 parts of charged CF

EXAMPLES 31-35

Electrolytic polymerization was conducted in the same manner as in Example 29 but using separately vinyltriethoxysilane, γ-methacryloxypropyl trimethoxysilane, vinyltripropoxysilane, vinyl-tris(β-methoxypropoxy)silane, and γ-methacryloxybutyltrimethoxysilane as a reactive monomer in place of vinyl-tris(β- composition together with a cylindrical filter paper and subjecting the composition sample to Soxhlet extraction with chloroform for 24 hours. For comparison, the same test was conducted on a composition (Comparative Example 16) prepared by a bulk polymerization in the presence of the same CF roving using a common radical polymerization initiator. Results of these tests are shown in Table 21. Therefrom it has proved that, while the polymer in the composition of Comparative Example 16 is completely extracted during 24 hours, the polymer of the composition obtained by the process of this invention is scarcely extracted, that is, most of the polymer is firmly bonded to the CF without being extracted.

As can be seen from Table 22, in the process of this invention, no dependency on the kind of CF was observed of polymerization activity, amounts of polymer deposited on CF were generally satisfactory, and percentages of polymer extracted from the product compositions were low, indicating that most of the polymers were firmly bonded to CF without being extracted.

TABLE 21

| | Polymerization process | Amount of polymer*2 deposited on CF (parts) | Percentage of polymer extracted with chloroform for 24 hours |
|---|---|---|---|
| Example 29 | Process of this invention, Reactive monomer: Vinyl-tris($\beta$-methoxyethoxy)silane | 58 | 5 |
| Example 30 | Process of this invention, Reactive monomer: Mixture of vinyl-tris($\beta$-methoxyethoxy)-silane and MMA | 55 | 6 |
| Example 31 | Process of this invention, Reactive monomer: Vinyltriethoxysilane | 50 | 5 |
| Example 32 | Process of this invention Reactive monomer: $\gamma$-Methacryloxypropyltrimethoxysilane | 52 | 5 |
| Example 33 | Process of this invention Reactive monomer: Vinyl-tripropoxysilane | 32 | 8 |
| Example 34 | Process of this invention, Reactive monomer: Vinyl-tris($\beta$-methoxypropoxy)silane | 42 | 7 |
| Example 35 | Process of this invention, Reactive monomer: $\gamma$-Methacryloxybutyl trimethoxysilane | 28 | 9 |
| Comparative Example 16 | Bulk polymerization process Initiator: AIBN*1 | 85 | 100 |

*1AIBN: Azoisobutyronitrile
*2Based on 100 parts of charged CF.

EXAMPLE 36

Electrolytic polymerizatiom was conducted in the same manner as in Example 29 but using different kinds of CF. Results of evaluating the product compositions are shown in Table 22.

EXAMPLE 37

Electrolytic polymerization was conducted in the same manner as in Example 29 but using 25 g of the vinylsilane compound and 25 g each of the monomers shown Table 23 as a reactive comonomer copolymerizable with the vinylsilane compound. Results of evaluating the product compositions are shown in Table 23.

TABLE 22

| No. | CF | Nature of fiber | Average diameter of monofilament ($\mu$) | Amount of*3 polymer deposited on CF (parts) | Percentage of polymer extracted with chloroform for 24 hours |
|---|---|---|---|---|---|
| 1 | From pitch*1 (T-101S) | Carbonaceous | 12.5 | 59 | 5 |
| 2 | From pitch*1 (T-201S) | Graphitic | " | 55 | 7 |
| 3 | From Pan*2 (HT) | Carbonaceous | " | 58 | 5 |
| 4 | From Pan*2 (HM) | Graphitic | " | 57 | 8 |

Notes:
*1Tradename: Kurekatow, made by Kureha Chem. Ind. Co., Ltd.
*2Made by Mitsubishi Rayon Co., Ltd.
*3Conditions of electrolytic polymerization. CF, 0.123 part; DMF, 500 parts; NaNO3, 25 parts; Vinyl-tris($\beta$-methoxyethoxy)silane, 50 parts.

TABLE 23

| No. | Reactive comonomer | Amount of comonomer added (parts) | Supporting electrolyte NANO3 (parts) | PAN-derived CF (part) | Solvent DMF (parts) | Polarity of CF during electrolysis | Amount of polymer deposited on CF (parts) |
|---|---|---|---|---|---|---|---|
| 1 | MMA | 25 | 2.5 | 0.123 | 500 | anode | 50 |

TABLE 23-continued

| No. | Reactive comonomer | Amount of comonomer added (parts) | Supporting electrolyte NANO₃ (parts) | PAN-derived CF (part) | Solvent DMF (parts) | Polarity of CF during electro-lysis | Amount of polymer deposited on CF (parts) |
|---|---|---|---|---|---|---|---|
| 2 | ST | " | " | " | " | " | 28 |
| 3 | Vinyl acetate | " | " | " | " | " | 35 |
| 4 | BuA | " | " | " | " | " | 42 |
| 5 | MAA | " | " | " | " | " | 40 |
| 6 | GMA/MAA | " | " | " | " | " | 65 |
| 7 | GMA/BuA | " | " | " | " | " | 60 |

As is evident from Table 23, any usual vinyl monomer radical-polymerizable can be used as a reactive comonomer in this invention.

EXAMPLE 38

A roving (0.123 g) of PAN-derived CF (HT, made by Mitsubishi Rayon Co., Ltd.) was immersed in a solution prepared by dissolving 250 g of sodium nitrate as a supporting electrolyte in 500 g of demineralized water. After being thoroughly dried, the treated CF was all immersed in an electrolytic solution [50 g of vinyltris($\beta$-methoxyethoxy)silane in 500 g of DMF] contained in the reactor of the same electrolytic polymerization apparatus as used in Example 29. Then, direct current from the D.C. generator was flowed between the CF as anode and the electrolytic solution, thereby carrying out the electrolytic polymerization at room temperature for one hour. During the electrolysis, the current density was adjusted to 0.27 A/dm² by means of the rheostat.

The product composition was evaluated in the same manner as in Example 29. The results showed that the amount of polymer deposited on the CF was 52 parts per 100 parts of CF and the polymer was bonded uniformly and firmly to the CF surface.

EXAMPLE 39

A unidirectional composite was prepared from the CF-polymer composition obtained from a mixture of 1,000 parts of KBC 1003 [vinyltris($\beta$-methoxyethoxy)silane], 24.6 parts of CF, 50 parts of sodium nitrate and 100,000 parts of DMF according to the present invention and a general-purpose epoxy resin of bisphenol A type, and was shaped into test pieces, which were then measured for mechanical properties such as strand strength, interlaminar shear strength, and flexural strength. For comparison, another composite sheet (simple blend) was similarly prepared by using untreated CF and evaluated. Results are shown in Table 24.

TABLE 24

| | Mechanical properties | | |
|---|---|---|---|
| | Strand strength kg/mm² | Inter-[1] laminar shear strength kg/mm² | Flexural[1] strength kg/mm² |
| Blend of the CF-polymer composition of this invention with epoxy resin | 398 | 9.88 | 187.6 |
| Simple blend of CF with epoxy resin | 340 | 7.30 | 148.1 |

[1]CF content 60 Vol. %

Table 24 indicates that the CF-polymer composition of this invention exhibits excellent mechanical properties in practical use.

EXAMPLE 40

Electrolytic polymerization was conducted in the same manner as in Example 1 or 12 but by using CF's which were defferent in average diameter of monofilament as shown in Table 25. Results of evaluating the resulting compositions are shown in Table 25. The results have revealed that the use of very fine CF further improves the CF binding state and markedly increases the amount of polymer deposited on CF.

TABLE 25

| | CF | | Reactive monomer | | Reaction product | |
|---|---|---|---|---|---|---|
| No. | Average diameter of monofilament (μm) | (part) | Denacol EX-821 | ERL-4299 | CF-binding state | Amount of polymer deposited on CF (parts per 100 parts of charged CF) |
| 1 | 2.0 | 0.123 | 50 parts | — | ◎ | 220 |
| 2 | 3.0 | " | " | — | ◎ | 180 |
| 3 | 5.0 | " | " | — | ◎ | 163 |
| 4 | 2.0 | " | — | 50 parts | ◎ | 280 |
| 5 | 3.0 | " | — | " | ◎ | 263 |
| 6 | 5.0 | " | — | " | ◎ | 235 |

What is claimed is:

1. A process for producing a polymer composition, wherein an organic polymer is strongly bonded to carbon fiber, by the electrolytic polymerization of a reactive monomer using the carbon fiber as an electrode, the reactive monomer comprising an aliphatic epoxy compound, alicylic epoxy compound, or vinylsilane compound, as a part or all of the reactive monomer.

2. The process for producing a polymer composition according to claim 1, wherein (I) the aliphatic epoxy compound is a bifunctional epoxy compound represented by the general formula

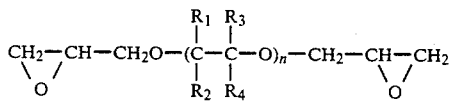

wherein $R_1$, $R_2$, $R_3$, and $R_4$ each represent hydrogen, $C_1$–$C_{20}$ alkyl, phenyl, substituted phenyl having $C_1$–$C_{20}$ alkyl, or halogen and n represents an integer of 0–50; and (2) the alicylic epoxy compound is a bifunctional epoxy compound represented by the general formula

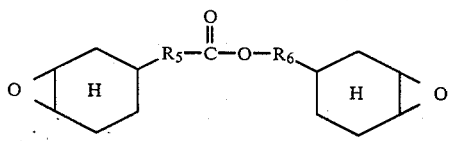

wherein; $R_5$ represents a residue of the formula

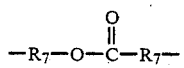

where $R_7$ is $C_1$–$C_{20}$ alkylene; and $R_6$ represents $C_1$–$C_{30}$ alkylene; or by the general formula

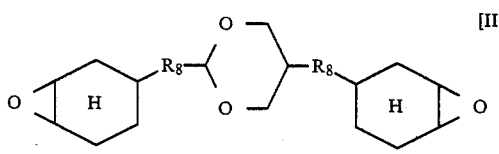

wherein $R_8$ represents $C_1$–$C_{30}$ alkylene.

3. The process for producing a polymer composition according to claim 2, wherein the aliphatic epoxy compound is represented by the general formula [I] in which n is an integer of 0–20.

4. A process for producing a polymer composition, wherein an organic polymer is strongly bonded to carbon fiber, by the electrolytic polymerization of a reactive monomer using the carbon fiber as an electrode, the reactive monomer comprising an organic titanate compound represented by

wherein $R_9$ represents $C_1$–$C_{50}$ alkyl, or by the general formula

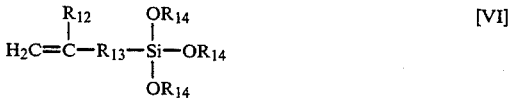

wherein $R_{10}$ represents hydrogen or $C_1$–$C_{40}$ alkyl and $R_{11}$ represents $C_1$–$C_{40}$ alkyl as a part or all of the reactive monomer.

5. The process for producing a polymer composition according to claim 1, wherein the vinylsilane compound is represented by the general formula $$\begin{array}{cc} R_{12} & OR_{14} \\ | & | \\ H_2C=C-R_{13}-Si-OR_{14} \\ & | \\ & OR_{14} \end{array} \quad [VI]$$

wherein; $R_{12}$ represents hydrogen, $C_1$–$C_{20}$ alkyl, phenyl, substituted phenyl having $C_1$–$C_{20}$ alkyl, or halogen; $R_{13}$ represents a residue of the formula $(CH_2)_m$ or $COO(CH_2)_Q$, where m is an integer of 0–30 and Q is an integer of 0–20; and $R_{14}$ represents $C_1$–$C_{15}$ alkyl or a residue of the formula —Y—O—Z, where Y is $C_1$–$C_{15}$ alkylene and Z is $C_1$–$C_{15}$ alkyl.

* * * * *